United States Patent
Meagher et al.

(10) Patent No.: US 8,566,930 B2
(45) Date of Patent: Oct. 22, 2013

(54) MONITORING MODULE

(75) Inventors: John Lippincott Meagher, Fairfax, VA (US); Sergio Nirenberg, Springfield, VA (US)

(73) Assignee: Science Applications International Corporation, San Diego, CA (US)

( * ) Notice: Subject to any disclaimer, the term of this patent is extended or adjusted under 35 U.S.C. 154(b) by 924 days.

(21) Appl. No.: 12/394,923

(22) Filed: Feb. 27, 2009

(65) Prior Publication Data

US 2010/0223425 A1 Sep. 2, 2010

(51) Int. Cl.
*G06F 11/34* (2006.01)

(52) U.S. Cl.
USPC ............................................ 726/22; 711/104

(58) Field of Classification Search
USPC ........ 726/9, 26, 27, 28, 29, 22; 713/224, 201, 713/212, 213, 220, 223; 380/200, 201, 202, 380/203, 277; 709/204, 201, 220, 227
See application file for complete search history.

(56) References Cited

U.S. PATENT DOCUMENTS

| | | | |
|---|---|---|---|
| 5,179,376 A | 1/1993 | Pomatto | |
| 5,281,955 A | 1/1994 | Reich et al. | |
| 5,574,811 A | 11/1996 | Bricheno et al. | |
| 5,682,337 A | 10/1997 | El-Fishawy et al. | |
| 5,946,386 A | 8/1999 | Rogers et al. | |
| 6,075,451 A | 6/2000 | Lebowitz et al. | |
| 6,108,741 A | 8/2000 | MacLaren et al. | |
| 6,122,693 A | 9/2000 | Gutta et al. | |
| 6,134,619 A | 10/2000 | Futral et al. | |
| 6,170,049 B1 | 1/2001 | So | |
| 6,269,392 B1 | 7/2001 | Cotichini et al. | |
| 6,345,330 B2 | 2/2002 | Chu | |
| 6,456,084 B1 | 9/2002 | Wu et al. | |
| 6,496,346 B1 | 12/2002 | Bruckner | |
| 6,519,672 B2 | 2/2003 | Scardamalia et al. | |
| 6,567,882 B1 | 5/2003 | Onagawa | |
| 6,668,372 B1 | 12/2003 | Wu | |
| 6,681,331 B1 | 1/2004 | Munson et al. | |
| 6,687,240 B1 | 2/2004 | Moertl et al. | |
| 6,823,421 B2 | 11/2004 | Luse et al. | |
| 6,895,367 B1 | 5/2005 | Lee | |
| 6,917,288 B2 | 7/2005 | Kimmel et al. | |
| 6,954,209 B2 | 10/2005 | Olarig | |

(Continued)

OTHER PUBLICATIONS

Bartzoudis, et al., "Concurrent Monitoring of PCI Bus Transactions for Timely Detection of Errors Initiated by FPGA-Based Applications", Instrumentation and Measurement Technology Conference Proceedings, May 1-3, 2007, pp. 1-6, IEEE Xplore.

(Continued)

*Primary Examiner* — Jeffrey Pwu
*Assistant Examiner* — Nega Woldemariam
(74) *Attorney, Agent, or Firm* — Banner & Witcoff, Ltd.

(57) ABSTRACT

A system and associated method for monitoring the execution of software on one or more computers by receiving traffic from within the monitored computer(s). The monitoring may take place passively, such that the operation of the monitored computer or computers is completely unaffected by the monitoring. More intensive monitoring, such as maintenance of a shadow copy of the RAM of the monitored computer, may be initiated upon recognition of a pattern in the data received from the monitored computer. The execution of software on the monitored computer may be halted by the monitoring module. The monitoring module may also read from or write to the memories of the monitored computer.

31 Claims, 8 Drawing Sheets

(56) References Cited

U.S. PATENT DOCUMENTS

| | | | |
|---|---|---|---|
| 6,972,676 | B1 | 12/2005 | Kimmel et al. |
| 7,096,499 | B2 | 8/2006 | Munson |
| 7,130,942 | B2 | 10/2006 | Gemelli et al. |
| 7,188,121 | B2 | 3/2007 | Tracey et al. |
| 7,276,779 | B2 | 10/2007 | Shibata |
| 7,376,779 | B2 | 5/2008 | Chu |
| 7,496,694 | B2 | 2/2009 | Balasubramanin et al. |
| 2003/0172213 | A1 | 9/2003 | Garcia et al. |
| 2004/0138827 | A1 | 7/2004 | Li et al. |
| 2004/0243649 | A1 | 12/2004 | Husemann et al. |
| 2006/0070118 | A1 | 3/2006 | Munson et al. |
| 2006/0282823 | A1 | 12/2006 | Li et al. |
| 2007/0174910 | A1* | 7/2007 | Zachman et al. ............... 726/18 |
| 2008/0005745 | A1 | 1/2008 | Kureya et al. |
| 2008/0120440 | A1 | 5/2008 | Balasubramanian et al. |
| 2008/0140989 | A1 | 6/2008 | Dudau et al. |
| 2008/0148036 | A1* | 6/2008 | Westerinen et al. ............. 713/2 |

OTHER PUBLICATIONS

Tektronix Product No. TMSSC2, identified in "mPGA604 Socket Processor Support", http://www.tek.com/Measurement/logic_analyzers/bus_support/support/mpga604/, visited Feb. 27, 2009, pp. 1-3, Tektronix, Inc.

Tektronix Product No. TMSST1, identified in "LGA775 Socket Processor Support", http://www.tek.com/Measurement/logic_analyzers/bus_support/support/lga775/, visited Feb. 27, 2009, pp. 1-2, Tektronix, Inc.

Tektronix TLA7012 and TLA7016 Logic Analyzers, identified in "Tektronix Logic Analyzers: TLA 7000 Series Mainframes", http://www2.tek.com/cmswpt/psdownload.lotr?ct=PS&cs=psu&ci=13432&lc=EN, Sep. 15, 2006, pp. 1-4, Tektronix, Inc.

Tektronix TLA5000B Logic Analyzers, identified in "TLA5000B Series Logic Analyzers", http://www2.tek.com/cmswpt/psdownload.lotr?ct=PS&cs=psu&ci=13482&lc=EN, Sep. 15, 2006, pp. 1-4, Tektronix, Inc.

Tektronix TLA7A module, identified in "Understanding and Performing RapidIO Testing", http://www.tek.com/Measurement/App_Notes/5A_16056/eng/5AW_16056_0.pdf, Jun. 17, 2002, pp. 1-16, Tektronix, Inc.

Tektronic TLA721 mainframe, identified in "Tektronix Logic Analyzers: TLA700 Series Mainframes" (Part 1), http://www2.tek.com/cmswpt/psdetails.lotr?ct=PS&cs=psu&ci=13442&lc=EN, Aug. 16, 2005, pp. 1-2, Tektronix, Inc.

Tektronic TLA721 mainframe, identified in "Tektronix Logic Analyzers: TLA700 Series Mainframes" (Part 2), http://www2.tek.com/cmswpt/psdetails.lotr?ct=PS&cs=psu&ci=13442&lc=EN, Aug. 16, 2005, pp. 1-7, Tektronix, Inc.

\* cited by examiner

MONITORING MODULE

FIELD OF THE INVENTION

The invention relates generally to monitoring the execution of software. More specifically, aspects of the invention relate to using hardware to collect information from a computer executing software.

BACKGROUND

Security researchers sometimes study the execution and propagation of software that they did not write, such as computer viruses. One method of studying software execution and propagation involves purposefully introducing the software into a testbed of networked computers. The researchers then observe how the software executes and spreads within the testbed.

There is sometimes concern that malicious software may be able to detect the researchers' monitoring efforts and change its behavior in response. Consequently, some researchers study the execution of software using logic analyzers, which passively read the data traveling over a wire or a bus.

Logic analyzers typically reside outside of the case of the monitored computer and connect to electrical circuits within the case of the monitored computer via wires. When many computers are monitored at once, the added bulk of physically separate logic analyzer units can become costly and cumbersome.

In cases where only the functional result of a virus infection is of interest, e.g. unwanted transmission of information from the host to the virus operator or a third party, it may be sufficient to use a protocol analyzer or "sniffer" on the network interface to track the network inputs and outputs of the machine under attack. However, in cases where it is desirable to analyze the structure and function of the attack code, it is desirable to discover the instruction flow that leads to the result.

BRIEF SUMMARY

This summary is not intended to identify any critical or key elements of the invention, but instead merely presents certain introductory concepts so that the full scope of the invention may be appreciated upon reading the full specification and figures, of which this summary is a part.

In general terms, the invention allows the execution of software to be monitored. The monitoring takes place by receiving data that travels within the monitored computer as it executes software. This data can then be stored, synthesized, and/or transmitted. In some embodiments of the invention, the monitoring system is on a same circuit board as the computer being monitored. In other embodiments, the monitoring system may be one or more separate circuit boards from the computer being monitored.

In a first embodiment, a monitoring module and a host module are integrated within a single system mainboard. As the host module executes software, the monitoring module monitors by receiving traffic from within the host module. The monitoring module is capable of monitoring the host module without affecting the host's operation.

In a second embodiment, a monitoring module plugs into one or more slots or connectors of a monitored computer. The slots or connectors may include interface connectors, such as PCI or PCI-Express, memory slot connectors, or a first or second processor socket on a standard mainboard. As the monitored computer executes software, the monitoring module monitors by receiving the traffic that flows to the slots or connectors of the monitored computer.

In a third embodiment, multiple host modules are contained within a single circuit board, and one or more monitoring modules monitor the execution of software on the host modules.

A monitoring module may send the data it captures, or a summary or synthesis thereof, to another computer. A monitoring module sometimes interacts with the monitored computer. For example, a monitoring module may be configured to halt the execution of software on a monitored computer.

Other embodiments and variations will be apparent upon reading the detailed description set forth below. The invention is not intended to be limited in any way by this brief summary.

DETAILED DESCRIPTION

The operation of software running on a monitored computer can be better understood when data is collected from the monitored computer while the software runs. This data can be collected from within the monitored computer by receiving the traffic created by the components of the monitored computer. The received data can then be stored, synthesized, and/or transmitted.

Figure 1:
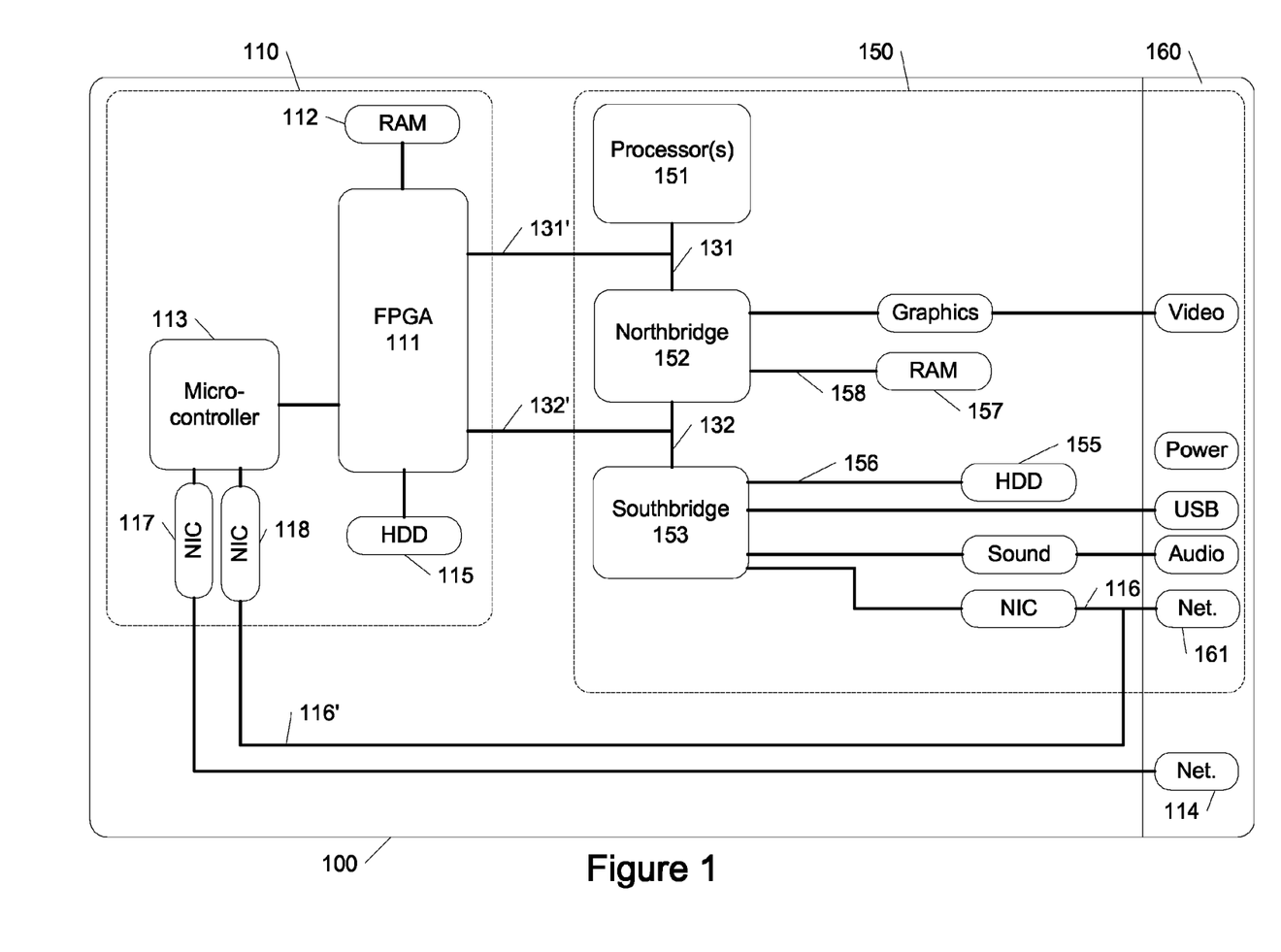
FIG. 1 illustrates a system mainboard block diagram in accordance with one embodiment, which shows one or more illustrative aspects of the invention.

FIG. 1 illustrates an illustrative embodiment of the present invention. System mainboard 100 may contain two distinct computers. Host module 150 may contain the computer hardware normally associated with a desktop computer. Alternatively, host module 150 may contain the computer hardware normally associated with a desktop computer, notebook computer, thin client, mobile device, or any other type of computer. Monitoring module 110 may be configured to monitor the execution of software on host module 150. Input/Output section 160 of system mainboard 100 may contain connectors for interfacing with devices external to the board, e.g., audio, video, network, data, and/or power interfaces, among others.

In host module 150, the processor or processors 151 communicate with northbridge 152 via front side bus 131. Northbridge 152 communicates with southbridge 153 via peripheral bus 132. Northbridge 152 typically controls the faster-performing components of the computer, such as the RAM and graphics card(s). Southbridge 153 typically contains or controls the slower-performing components, such as the hard drive, sound card, USB connections, etc.

The computer architecture of the host module 150 in FIG. 1 is illustrative, and represents a simplified view of a conventional computer's configuration. Of course, many other system architectures are possible. For example, some desktop processors feature integrated memory controllers. Other variations of the architecture shown in FIG. 1 include integrating functions of the northbridge or southbridge into the processor, adding more functions to the northbridge, merging the functions of the northbridge and southbridge into a single chip, adding additional chips to the conventional processor-northbridge-southbridge chain, configuring the chips with parallel communications paths, etc. In some cases, an entire "system on a chip" is possible. In other words, it is possible to merge the northbridge, southbridge, and processor functions onto a single chip. Systems on a chip may also integrate some or all of the computer's components, such as the graphics controller and/or the RAM.

As used herein, "front side bus" refers to any bus directly connected to the processor(s). "Peripheral bus" refers to any bus other than the front side bus which contains traffic that may ultimately reach a peripheral device. "Traffic" refers to data that travels over a bus or any other wire or wires. Similarly, the words "hard disk" are used throughout this document to represent any nonvolatile storage medium that is randomly accessible for both reads and writes, including, e.g., magnetic media, holographic and optical media, solid state memory, etc. The words "random access memory" refer to a randomly accessible storage medium that is either volatile or nonvolatile. The acronym "RAM" is generally used to indicate a relatively high-speed, volatile, randomly accessible storage medium, including DRAM (dynamic ram) or SRAM (static RAM). The term "virus", as used herein, includes all forms of malicious software, including malware, adware, worms, agents ("bots"), and trojans.

Returning to the system mainboard shown in FIG. 1, monitoring module 110 contains FPGA 111, which receives the front side bus traffic of host module 150 along bus 131'. FPGA 111 also receives peripheral bus traffic of host module 150 along bus 132'. Busses 131 and 131' are unitary. In other words, they are the same bus. For example, if bus 131 were to contain three wires A, B, and C, then bus 131' would contain corresponding wires A', B', and C'. Each corresponding pair of wires carries the same data. Each corresponding pair of wires may be electrically connected. Alternatively, a repeater may transmit the traffic from bus 131 onto bus 131'. The term "wire" is meant to encompass traces as well, which are wires located within a circuit board. Busses 132 and 132' may also be unitary.

FPGA 111 may also be in communication with RAM 112, hard disk 115, and microcontroller 113. Microcontroller 113 helps control the operation of FPGA 111. It is connected to its own network interface 114 via network interface controller 117. It is also connected to network interface 161 of the host module via network interface controller 118 and connection 116'. Connections 116 and 116' are unitary.

Like host module 150, the architecture of monitoring module 110 is merely illustrative. Other architectures may also or alternatively be used. For example, an ASIC may be used in place of or in addition to an FPGA. The RAM, hard disk, or connection 116' can be omitted or connected differently. The micro-controller can be in the form of an independent chip, or it can be integrated into the FPGA as an "IP core", which equips the FPGA with microprocessor functionality. The microcontroller can be replaced with another type of processor, such as a desktop computer processor, and some or all of the additional chips and peripherals of a traditional computer can be added to the monitoring module as well. These additional architectures are illustrative and not meant to be limiting.

Monitoring module 110 may be configured to monitor the execution of software on host module 150. One method of monitoring the execution of software is passive monitoring. When monitoring is executed in a passive manner, host module 150 acts as an independent computer. The existence of monitoring module 110 preferably does not affect the operation of the host module in any way. Monitoring module 110 monitors passively when it receives the traffic produced by the host module along lines 131', 132' and 116', but does not send any traffic to the host module. When this occurs, traffic flows along lines 131, 132, and 116 as if the lines to the instrumentation module were not present. Network Interface Controller (NIC) 118 operates in a receive-only "promiscuous" mode in which all Ethernet frames and IP packets are sampled, regardless of address fields. Passive monitoring is advantageous because software executing on host module 150 cannot detect that it is being monitored and change its behavior in response.

At times it may be advantageous to disrupt the normal functioning of host module 150. For example, a researcher may wish to halt host module 150. Doing so would give the researcher time to examine or modify the configuration of host module 150 in order to better understand the software running thereon. One method of halting the host module is to send specific instructions to processor(s) 151. As is known in the art, the specific instructions or control signals needed to halt processor(s) 151 may vary depending on the processor model(s) in use. Usually, a signal can be asserted on a single pin to halt the processor until the signal is removed. Another method of halting the host module is to intercept (and optionally cache) all traffic to and from the processor, replacing it with no-ops. No-ops are instructions that do not produce a meaningful result. No-ops therefore will not change the state of the host module in a meaningful way.

Halting the host module, and many of the features that follow, require the monitoring module to send instructions or other traffic to the host module. The precise method of sending instructions or other signals is a matter of design choice, and may depend on the specific hardware used. Depending on the specifications for the bus, instructions or requests may be sent in the same manner any other device on the bus would send such instructions or requests. Of course, doing so may require allowing the monitoring module's connection to become a recognized device on the bus. Another method of sending instructions is to gate the normal bus traffic and insert the instructions in its place. For instance, one method of sending instructions to the processor is for a gate to be located at the junction of lines 131' and 131 in FIG. 1. Thus FPGA 111 can preempt the flow of normal traffic in order to inject its instructions. The preempted traffic may be cached for later retransmission. Instructions may also be injected during otherwise idle cycles.

The monitoring module may also be used to configure the host module. For instance, the monitoring module can receive a disk image via network interface 114, and it can load the disk image onto hard disk 155 of the host module. Through additional connections to the host module (not shown), the monitoring module may power on the host module by sending the same electrical signal as when a normal computer's power button is pressed.

In some instances, a researcher may be interested in examining the changes made to a disk (or disks) as software executes. One way to do this is to create a shadow copy of the disk(s). Hard disk 115 may be initialized to be an exact copy of hard disk 155. This initialization can be accomplished by copying entire partitions from hard disk 155. If hard disk 155 is initialized to a disk image by the monitoring module, the monitoring module can also initialize its own hard disk 115 at the same time. When monitoring begins, hard disk 115 may shadow the operation of hard disk 155. In other words, every change made to hard disk 155 will also be made to hard disk 115. This can be accomplished by identifying all of the write-to-disk commands and associated data received via the peripheral bus that are destined for hard disk 155. The identified commands and associated data can then be sent to hard disk 115 as well.

Instead of initializing the shadow disk to be a mirror image of the monitored hard disk, the shadow disk can be initialized to an all-zeros state. If this is done, at the end of a monitoring period, hard disk 115 will contain a complete record of changes made to hard disk 155, and nothing else. The monitoring module may also catalog or summarize the changes made to the disk. These catalogs or summaries may be saved to the disk itself or to the RAM of the monitoring module. They may also be transmitted via network interface 114.

Not all software writes to a computer's hard disks. For example, some computer viruses or worms are capable of operating solely in RAM. The contents of RAM may also provide a better understanding of how the monitored software works. Thus it may be advantageous for the monitoring module to create a shadow copy of the host module's RAM 157 in RAM 112. A shadow copy of the host module's RAM may be maintained using the same techniques used to create a shadow copy of the host module's hard disk. All of the above discussion regarding initializing the memory, maintaining the shadow copy, and saving or transmitting the results also applies equally to operating a shadow copy of the host module's RAM. A shadow copy of one memory in the host module may be maintained in different type of memory in the monitoring module. For instance, if RAM 112 is large enough to hold all of the data to be written to it, a shadow copy of hard disk 155 may be maintained in RAM 112.

In many cases, a researcher has already identified a pattern related to the software under study. For example, a researcher may know or suspect that the studied software writes a certain string of bits or bytes to RAM or disk. Or that it accesses a certain memory address or address range. Or that it accesses a certain disk address or address range. Or that it sends certain traffic over network interface 161. Other examples of patterns include suspicious behaviors, such as an unusually long interrupt service routine. Recurrences of similar sequences of instructions being executed or data being accessed are also patterns a researcher may look for.

Whatever the pattern, it may be useful to configure the monitoring module to begin recording or transmitting data about the execution of software on the host module when the pattern is detected. Or it may be useful to halt the operation of the host computer when the pattern is detected to enable investigation of the host computer's state. Sending copies of the shadow RAM or shadow disk via network interface 114 may also facilitate investigations of the host computer's state. If shadow copies aren't being kept or don't contain complete information (such as when they are initialized to zero before monitoring begins), the RAM or disk of the host module can be read and transmitted via network interface 114.

In some cases, it may also be useful to configure the monitoring module to stop recording or transmitting data regarding the execution of software on the host module in response to a second pattern. For instance, if the researcher knows that the same code is being executed repeatedly, then the researcher may set the second pattern to be the same as the first. Thus the monitoring module begins monitoring when the pattern first occurs and stops monitoring when it recurs, thus avoiding collecting needlessly duplicative data. Of course, the second pattern may also be the absence of the first pattern. For example, if a particular region of memory is of interest, the monitoring may start when that address range is accessed and stop when it has not been accessed for some period of time. The second pattern may also be unrelated to the first.

Preferably, the monitoring module is configured to receive the pattern or patterns that may stop or start more intensive monitoring operations and/or notifications via its network interface. Thus the monitoring operations and alerts can be customized to suit the needs of the user and the particular software whose execution is being monitored. This configuration can be achieved by all or a portion of the software that runs on the monitoring module being received by the monitoring module via its network interface. Similar software changes are well known in the art. Examples include most firmware updates/replacements and operating system updates. Alternatively, only data, such as descriptions of patterns, might be sent to the monitoring module.

In some cases, it may be useful for information about the execution of software on the host module to be synthesized, summarized, or analyzed before being transmitted via network interface 114. The maps of memory areas accessed, discussed with reference to the creation of shadow copies above, are one example of this. Another example is making associations between the code being executed and certain traffic being transmitted over network interface 161. Or creating a listing of memory addresses accessed by each application running on the host module.

In addition to the embodiment and variations discussed above, it is important to understand that further embodiments and variations are possible. Monitoring module 150 receives traffic from the host module along lines 131', 132', and 116', but receiving traffic from other locations is also possible in other embodiments of the invention. For example, the monitoring module may receive traffic from different or additional locations in the host module, such as points 156 or 158, identified in FIG. 1. Also, the monitoring module can receive traffic from only a subset of the possible locations. For example, in some cases it may be advantageous to monitor only the front side bus.

Figure 6:
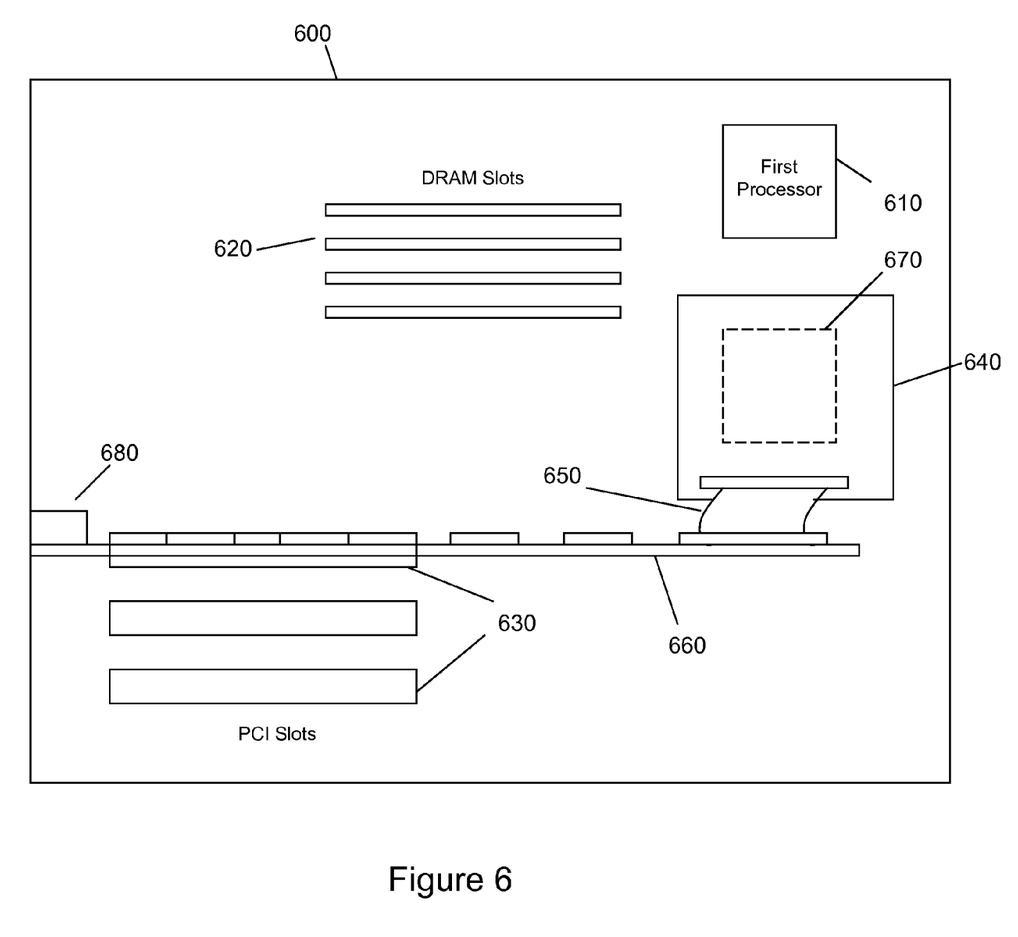
FIG. 6 shows a dual-socket mainboard adapted for monitoring in accordance with one or more illustrative aspects of the invention.
Figure 7:
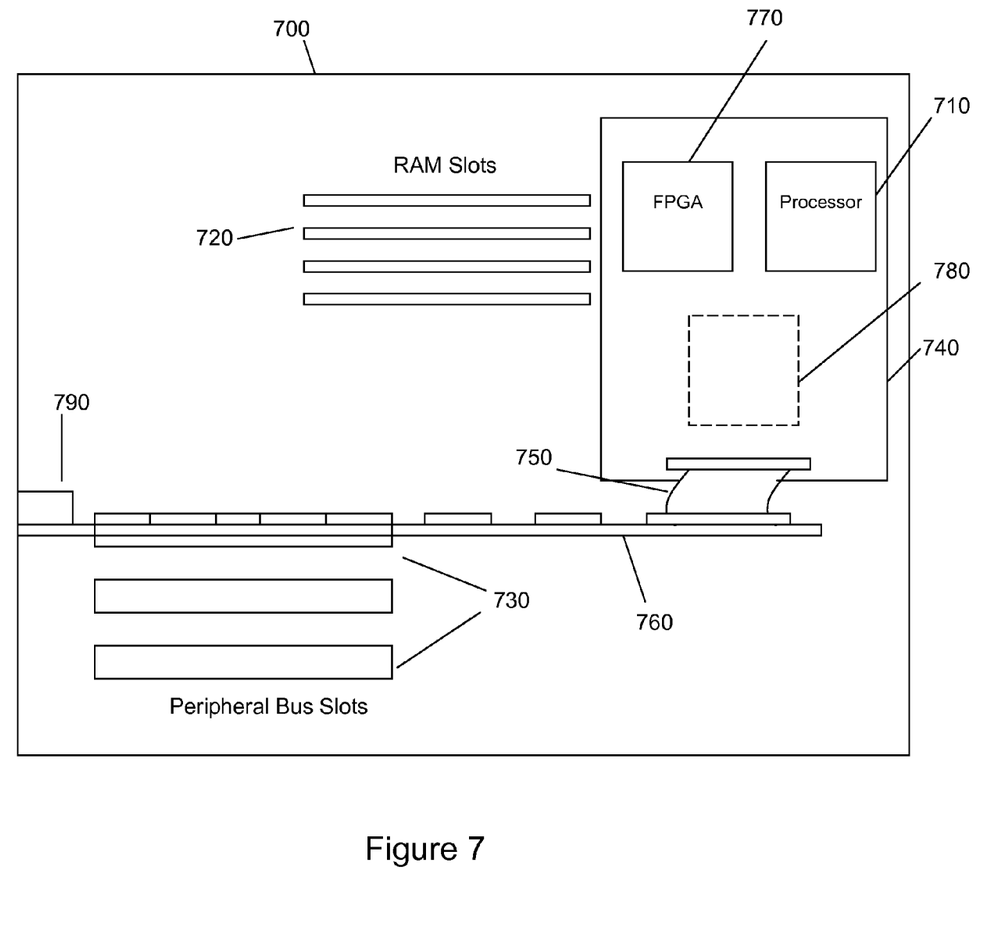
FIG. 7 shows a single-socket mainboard adapted for monitoring in accordance with one or more illustrative aspects of the invention.

If traffic is monitored solely from locations that are accessible via connectors on the surface of a circuit board (or other external connectors), then the monitoring module may be a separate device from the host module. In this case, the monitoring module and the monitored computer would not share the same system mainboard, as the examples in FIG. 6 and FIG. 7 show. Such designs may be advantageous from a cost perspective when the required number of system mainboards is too small to justify the cost of a custom mainboard design.

In many computers, the front side bus may be monitored via the processor socket or sockets on the system mainboard. The front side bus traffic can be received by placing a part between the processors and the sockets in which they would normally sit. This part sends copies of the front side bus traffic to the monitoring hardware. The monitoring hardware may be unitary with the part, or the monitoring hardware may be located elsewhere. A peripheral bus can be similarly monitored by plugging a card into a typical computer socket, such as a PCI socket. The entire monitoring module may be located on this card, or the card may interconnect with other components of the monitoring module, such as the aforementioned part that sits between a processor and its socket. In all of the examples given, it is possible to configure the monitoring module so that it operates passively, and therefore will not affect the operation of the host computer. Of course, it may be advantageous for the monitoring module to sometimes operate actively by sending traffic or control signals into the bus(es) it monitors, as discussed previously.

Another illustrative embodiment of the invention is shown in FIG. 6, which illustrates a top view of dual-socket mainboard 600. Mainboard 600 contains first processor socket 610, second processor socket 670, RAM memory sockets 620, and peripheral bus sockets 630, such as PCI slots. The illustrated embodiment exploits that mainboard 600 shares a common front side bus between the two processors sockets 610 and 670, and that mainboard 600 functions when only one socket is equipped with a processor. Assembly 640 is shown plugged into the second processor socket 670 to gain access to the front side bus.

Assembly 640 also accommodates cable 650, which optionally interconnects assembly 640 with assembly 660. Assembly 660 is plugged into one of PCI expansion slots 630. The circuitry and other components of the monitoring module may be contained on either or both of assemblies 640 and 660. Use of assembly 660 may be advantageous due to the larger physical area available for housing the circuitry and other components. Assembly 660 may also be configured to receive traffic from the peripheral bus. Power may be drawn from the host's peripheral bus. Alternatively, or if assembly 660 is not present, power may be drawn from a lead of the host computer's power supply.

Assembly 660, as shown, also provides one or more network interface connectors 680. The connectors may provide network connectivity for the monitoring module alone, or they may provide network connectivity for both the monitoring module and the host computer. The network interface circuitry for both the host computer and the monitoring module may be included in the monitoring module, such as on assembly 660.

Another illustrative embodiment of the invention is shown in FIG. 7. This embodiment does not require the dual-socket mainboard illustrated in FIG. 6. Instead, a front side bus interface assembly 740, which accommodates FPGA 770 and processor 710, is plugged into the mainboard processor socket 780. Thus, the front side bus is accessible to both the FPGA 770 and the processor 710.

Assembly 760 plugs into one of the peripheral bus connectors 730 on the single-socket mainboard 700. Cable 750 connects the front side bus interface assembly 740 to assembly 760.

Front side bus interface assembly 740 accommodates an FPGA 770 and processor 710 on the top, and a mating connector for processor socket 780 on the bottom. Alternatively, other configurations may be used, such as mounting the processor vertically. Also, the components of the monitoring module, such as FPGA 770, may be located on the front side bus interface assembly 740, on assembly 760, or both.

Assembly 760 also provides one or more network interface connectors 790. The connectors may provide network connectivity for the monitoring module alone, or they may provide network connectivity for both the monitoring module and the host computer. The network interface circuitry for both the host computer and the monitoring module may be included in the monitoring module, such as on assembly 760.

Especially when studying the propagation of computer viruses, monitoring one computer may not be enough. A common strategy is to create a group of networked computers (or virtual computers) and monitor the virus as it spreads among them. The virus may be first introduced to the group by one of the networked computers, or the networked computers may become infected due to an external attack.

Figure 2:
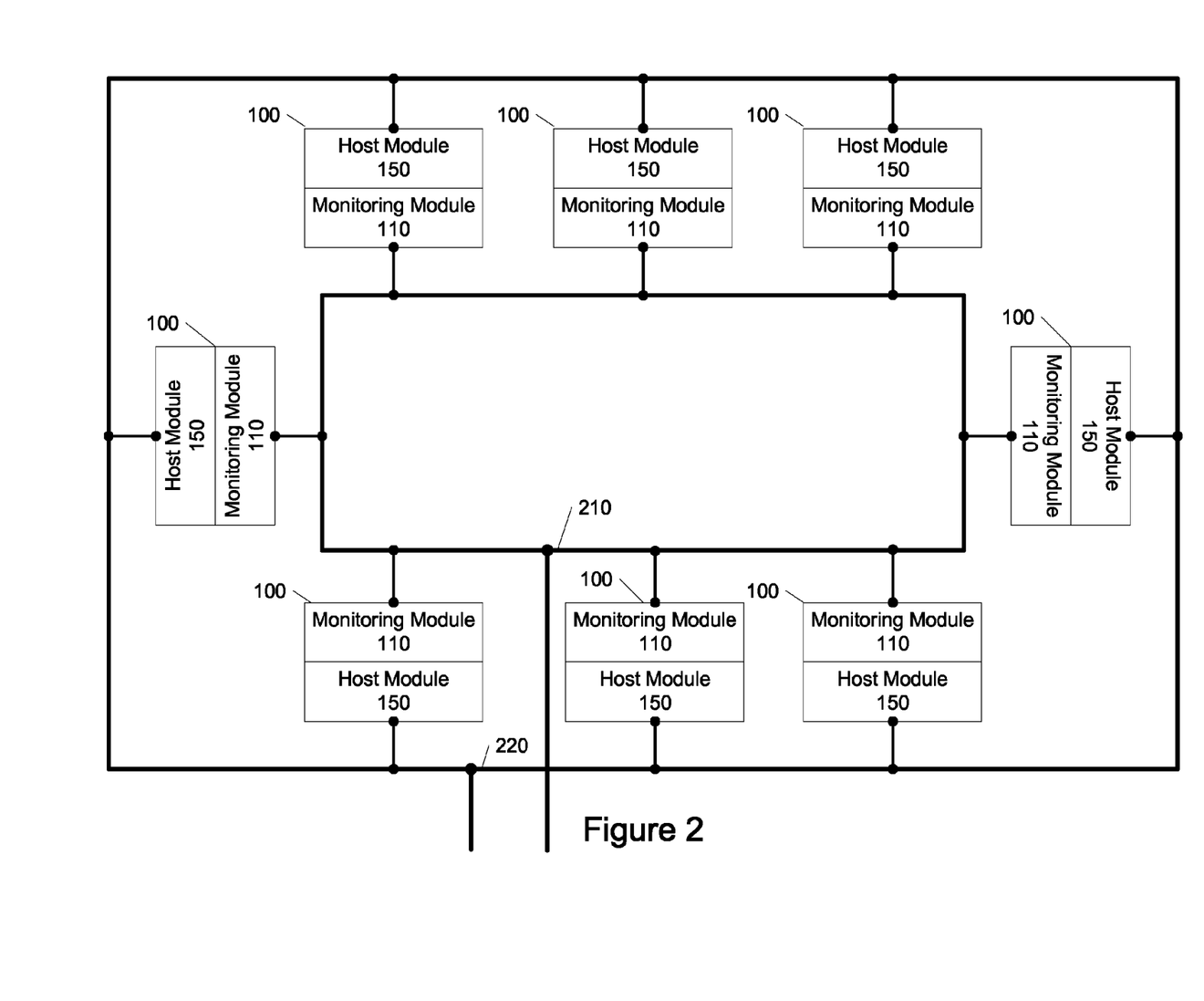
FIG. 2 illustrates networks interconnecting host modules and monitoring modules according to one or more illustrative aspects of the invention.

If the group of networked computers is made up of, for example, the system mainboards of FIG. 1, the result may be the networks shown in FIG. 2. In FIG. 2, each monitoring module is networked with all others on network 210. Each host module is networked with all others on network 220. Thus all network traffic related to monitoring the host modules is kept separate from the network (220) used by the host modules. This is advantageous because it allows for passive monitoring of even the network traffic. From a network emulation perspective, the arrangement of FIG. 2 could represent a small organization, and many similar instances of FIG. 2 could be interconnected by a network of routers and switches to represent larger networks.

While multiple system mainboards 100 and associated components are shown in FIG. 2, other embodiments may also be used to create monitoring module network 210 and host module network 220. For example, each host module may be separate from each monitoring module.

The entirety of FIG. 2 may be implemented on a single system mainboard. This may reduce the cost of producing multiple testbeds of monitored computers. Such system mainboards may have as few as two external network interfaces, one for the host module network 220, and one for the monitoring module network 210. Even fewer network interfaces are possible, such as if there is no desire to network multiple system mainboards together. Alternately, separate external network interfaces may be available for each embedded host module and/or each embedded monitoring module, etc.

Figure 3:
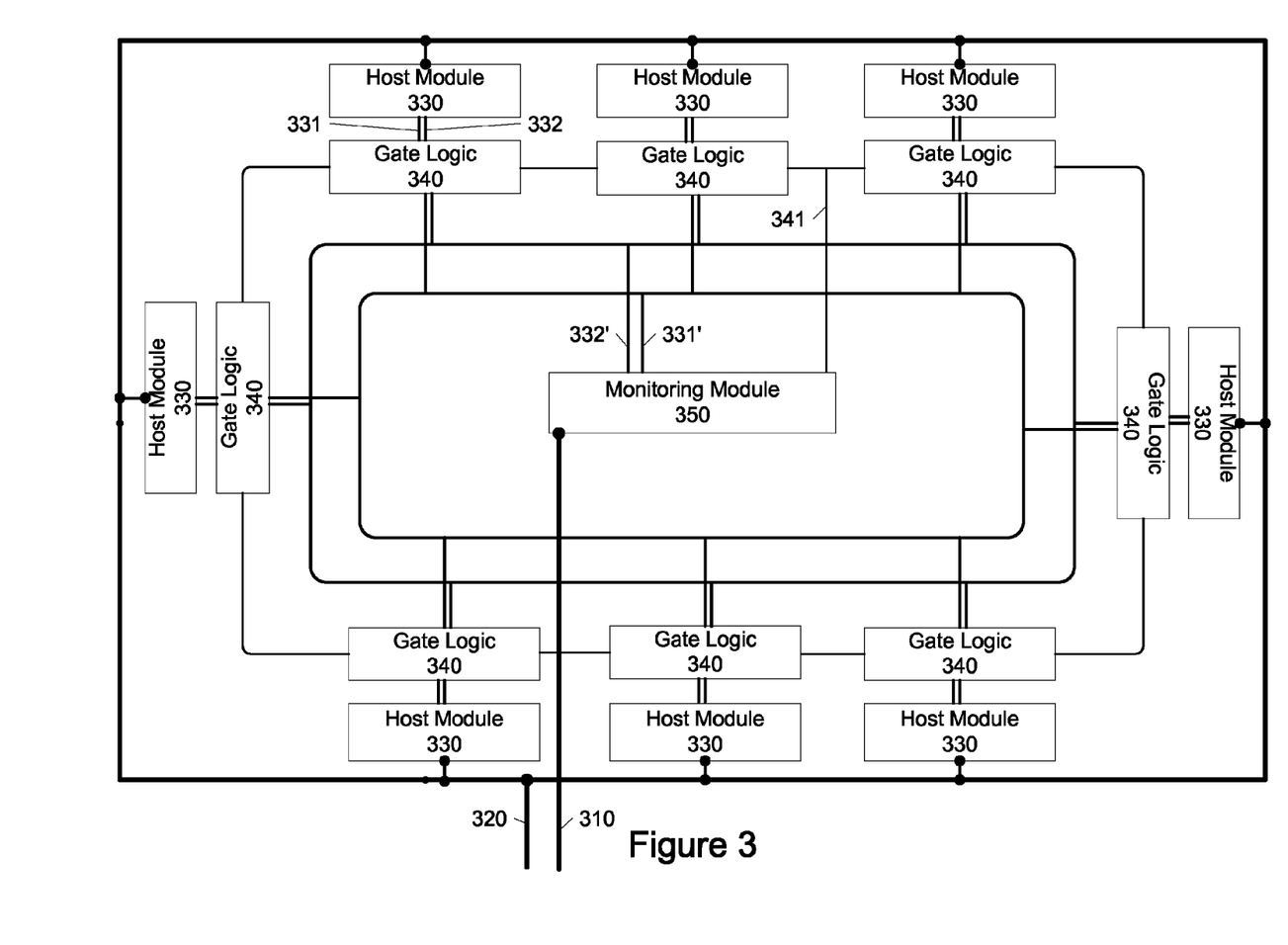
FIG. 3 shows a variation on the arrangement of FIG. 2, in which a single monitoring module is selectively enabled for any of the host modules.

Another illustrative embodiment of the invention is shown in FIG. 3. This embodiment is a variation of the above-described system mainboard. Hardware expenses may be saved by sharing a single monitoring module 350 across multiple host modules 330. In this example, the buses to be monitored, including the front side bus 331 and any peripheral buses, such as PCI Bus 332, are presented to a set of common buses 331' and 332' by gate logic 340. The gate logic may be integrated with the host modules. The gate logic may be configured to respond to a control signal sent along connection 341. The control signal may allow traffic from only one host module to enter the common busses at a time. Alternately, if the common busses are designed to carry traffic from more than one host module at once, the control signal sent along connection 341 may allow for more than one host module to transmit traffic to the common busses at the same time.

Multiple designs may allow the common busses to carry traffic from more than one host module at once. For example, if common bus 332' has twice as many wires as bus 332, then the traffic from two bus 332s, i.e., traffic from two host modules, may be transmitted on common bus 332' at the same time. Alternately, or in addition, multiplexing or other techniques may be used to combine multiple signals on a single wire. For example, common bus 332' may operate at twice the clock rate of bus 332. When carrying traffic from two host modules simultaneously, the data from each host module may be interleaved on common bus 332'. For example, traffic from one host module may be carried during even-numbered clock cycles, and traffic from the other host module may be carried during odd-numbered clock cycles. There is no requirement that the clock cycles be associated with a number. The even and odd labels above are included solely for clarity of explanation.

Figure 8:
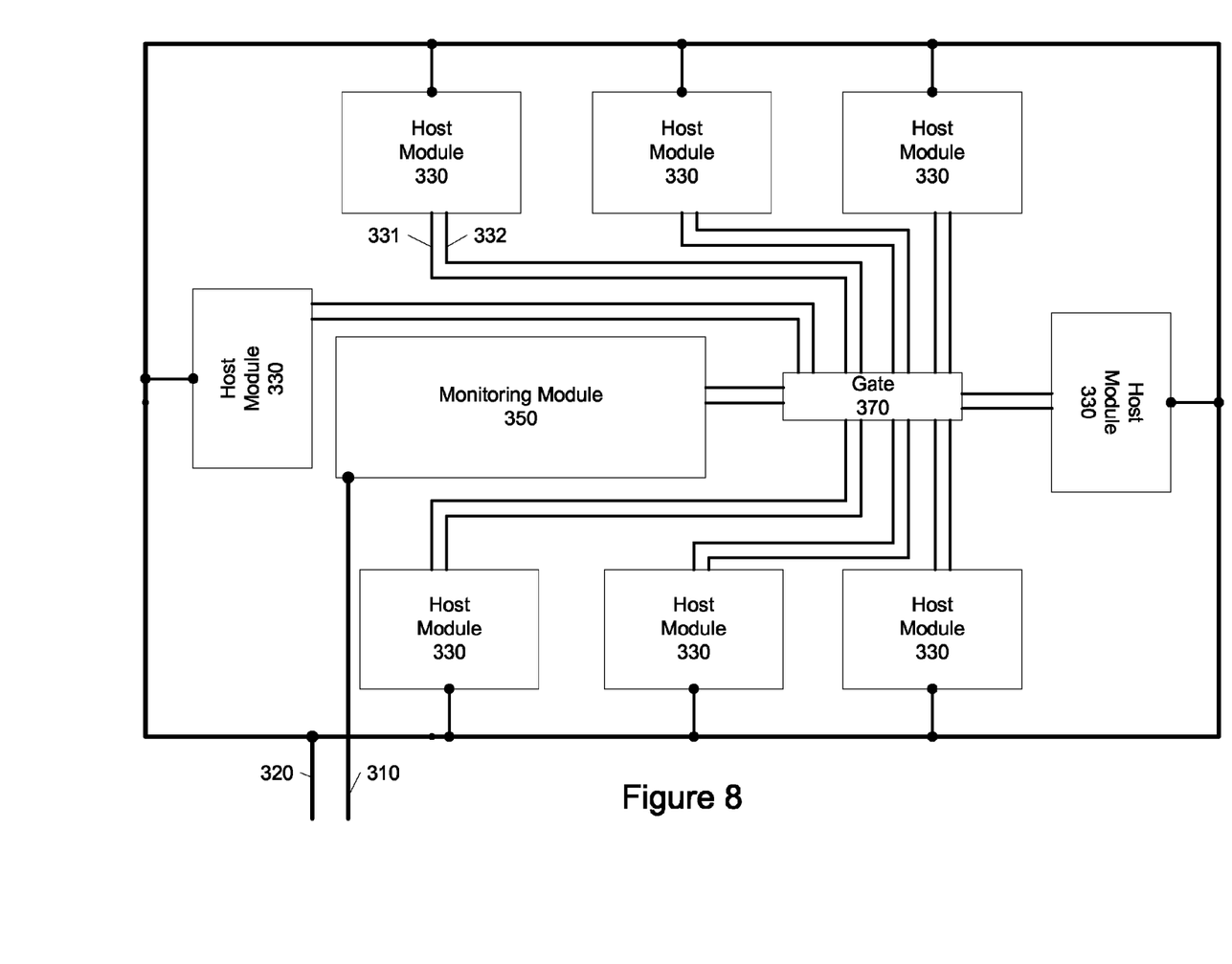
FIG. 8 shows a variation on the arrangement of FIG. 3, using a single gate, in accordance with one or more illustrative aspects of the invention.

The common buses 331' and 332' are monitored by the monitoring module 350. More or fewer common busses may be used to monitor more or fewer locations in the host modules. Another alternative embodiment is shown in FIG. 8. In FIG. 8, a single gate 370 receives traffic from all of the host modules and passes on traffic from one or more of the host modules in accordance with a control signal. In yet another alternative, gate 370 may be eliminated, and the monitoring module may be configured to monitor all of the host modules at once.

Figure 4:
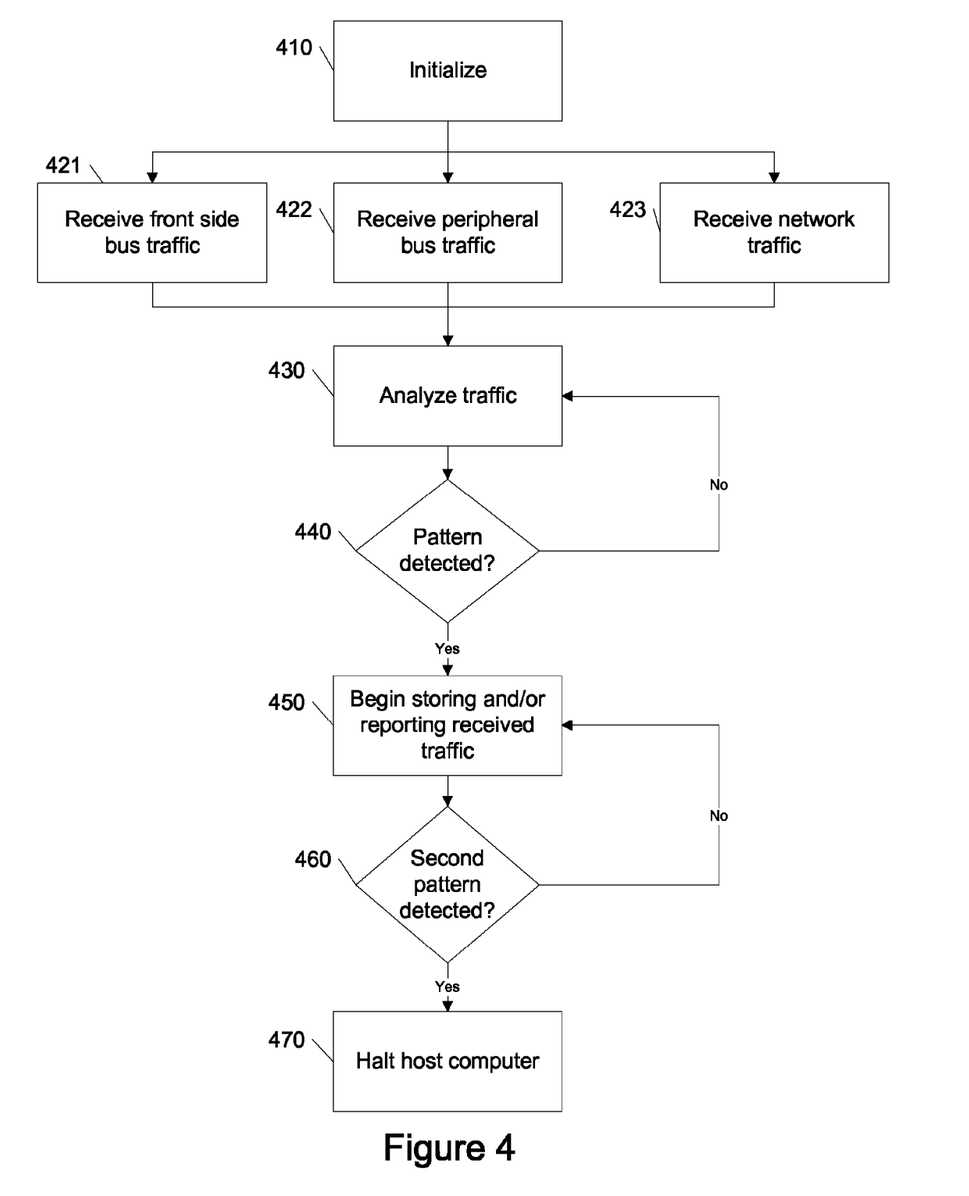
FIG. 4 shows a method of monitoring software executing on a monitored computer according to one or more illustrative aspects of the invention.

FIG. 4 illustrates a flowchart for a method of monitoring software in accordance with any of the various illustrative embodiments, or other embodiments not described herein. Like the other examples above, many variations of this process are possible. The steps or decisions shown may be removed, combined, or reordered. Other steps or decisions may be added. In this particular example, a researcher may be interested in obtaining a shadow copy of a monitored computer's RAM. The shadow copy contains only the changes made to the RAM between the time a virus is detected and the time the virus sends a transmission via the monitored computer's network interface.

In step 410, the monitoring hardware is initialized. Initialization may occur automatically. Initialization may also occur upon receipt of instructions from a third party, such as from a researcher's computer. In this example, the shadow RAM is set to zero. The patterns used to first identify the virus and to identify when it has completed a transmission are loaded into the monitoring hardware. The initialization may also involve receiving instructions on what data, if any, to report to third parties during or after the monitoring.

After initialization, monitoring begins. Steps 421, 422, and 423 illustrate three monitoring points from which traffic is received: a front side bus, a peripheral bus, and a network interface. The received traffic is analyzed for patterns in step 430. In this example, when the pattern used to identify the virus is detected in the monitored traffic, as illustrated by step 440, traffic representing writes to the monitored computer's RAM is stored in the shadow RAM. Also at step 450, an indication that the virus has been detected may be sent. The indication may be sent via a network interface. The pattern used to identify the virus may be a string of bits passing through the monitored computer's network interface or a string of bits residing in the monitored computer's RAM.

Step 460 shows that the storing and reporting ends upon detection of a second pattern because the monitored computer is halted, as shown by step 470. In this example, the second pattern is a string of instructions representing that the virus has terminated a transmission through the monitored computer's network interface. At this point data, such as information collected in the foregoing steps, or statistics about that information, may be transmitted, e.g., back to the researcher from whom the initialization data was received. Additional forensic analysis may also be performed on the host computer at this point. For example, the contents of an additional memory, such as a hard disk, may be inspected.

Figure 5:
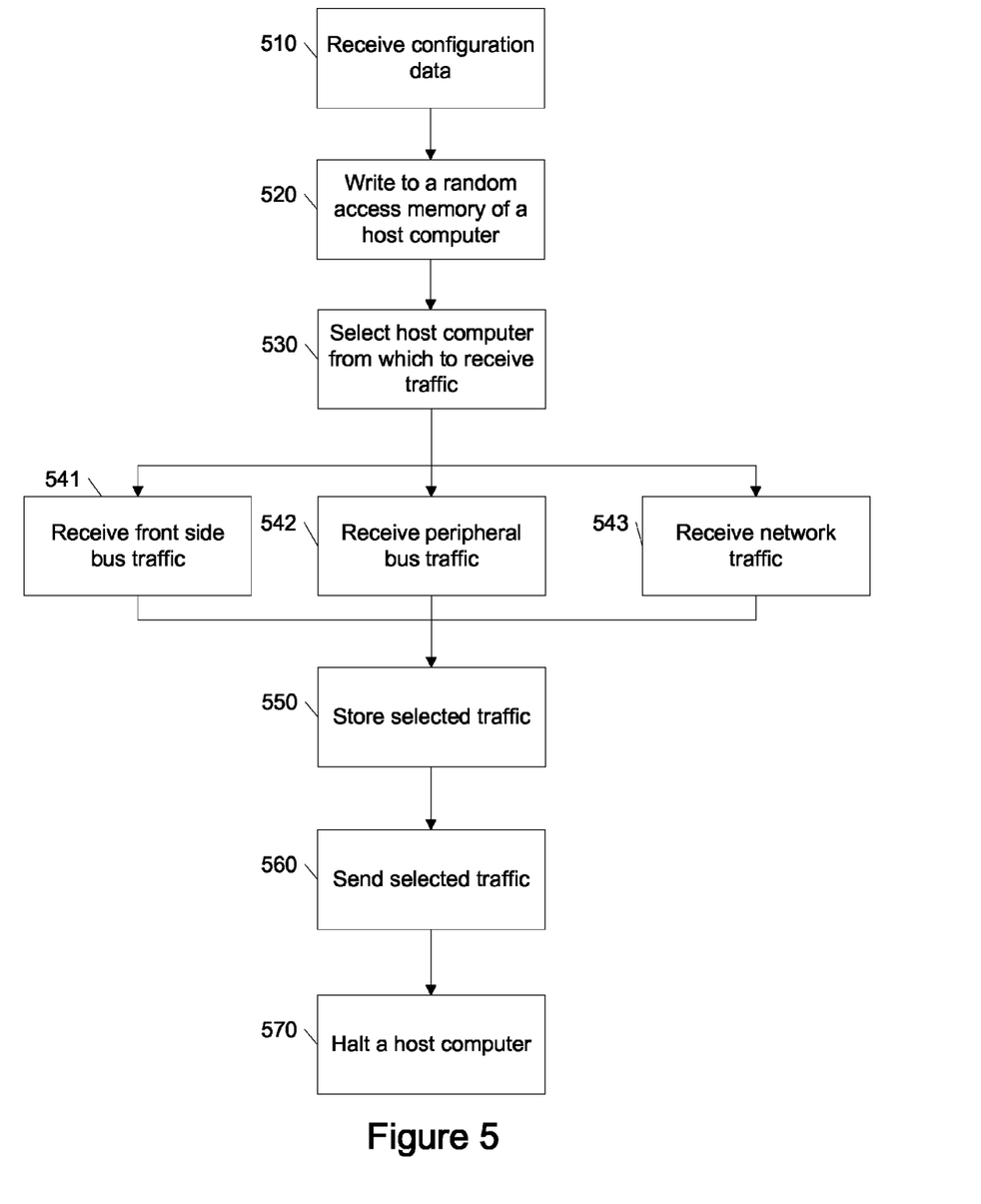
FIG. 5 shows a method of monitoring software executing on a monitored computer according to one or more illustrative aspects of the invention.

FIG. 5 illustrates a flowchart for a method of monitoring software in accordance with any of the various illustrative embodiments, or other embodiments not described herein. Like the other examples above, many variations of this process are possible. The steps shown may be removed, combined, or reordered. Other steps or decisions may be added.

In step 510, configuration data is received. The configuration data may be received, for example, from a researcher's computer or a network administrator's computer. The configuration data may instruct that certain metrics are to be computed, saved, and/or transmitted. For example, the configuration data may instruct that the areas of memory accessed by each program running on a host computer and the frequency of those memory accesses are to be monitored and saved. Step 510 is optional because a default configuration may be used.

In step 520, a random access memory of a host computer is written to. For example, a hard drive of a host computer may be initialized with a disk image containing the software to be studied. Step 520 is optional. The host computer may already be configured as desired.

In step 530, the host computer from which to receive traffic is selected. For example, if multiple host computers are connected to a gate, such as gate 340, then one of the host computers may be selected for monitoring by configuring gate 340 to pass on traffic from the selected computer. In some embodiments, traffic from multiple host computers may be received simultaneously. At step 530, some subset of the available host computers may be selected for monitoring. Step 530 is optional. Traffic from all available host computers may be received or a default configuration may be relied on.

In steps 541, 542, and 543, traffic is received. Traffic from more or fewer locations may be selected.

In step 550, selected traffic is stored. For example, the traffic indicating an access, such as a read or a write, to an area of memory may be selected. The selected traffic may be summarized by computing the frequency which each memory address or range is accessed. Traffic may be selected by means of the store and stop-storing triggers based on pattern or bus event data as discussed above.

In step 560, the some or all of the selected traffic is sent. For example, the memory addresses or ranges discussed in the previous paragraph may be transmitted to another computer. The configuration data received in step 510 may indicate the destination to which the information is sent. Step 560 is optional. For example, if a specific address range is never accessed, then the collected information may never be sent.

In step 570, the host computer is halted. Step 570 is also optional. It may be advantageous to allow the host computer to continue running. In some cases, it may be advantageous to halt the host computer only upon recognition of a pattern.

A useful mode of operation which applies to the methods described in both FIGS. 4 and 5 involves continuous storage in a circular buffer of all traffic on one or more buses while simultaneously watching for a predefined pattern, or for a pattern matching predefined criteria. Detection of the specified pattern then halts the host module and the storing process, after which the researcher can begin a forensic capture of the complete state of the host module and the bus events leading up to the trigger event. The trigger event, i.e., the pattern, may consist, for example, of a message transmitted to an unusual address, e.g., a virus operator, on network interface 114. This mode of operation may be run continuously, resulting in normal host operation until a pattern is detected.

One or more aspects of the invention may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

The above described embodiments are discussed with respect to analyzing the execution of software, but further uses are possible. For instance, a monitoring module may be used to measure the performance of a host module or the performance of specific components connected to a host module. It may also be used to analyze traffic on computer buses for reasons other than monitoring software execution, such as troubleshooting connected hardware or analyzing protocol behavior.

Monitoring modules may also be used for remote network management. For instance, instead of running anti-virus software on a host computer, a monitoring module may monitor the host computer and detect any viruses on it. This is advantageous because the monitoring module may be configured so that it does not affect the performance of the host computer. Using a monitoring module is also advantageous because unlike antivirus software, the monitoring module cannot be detected, tampered with or disabled by malicious software running on the host.

A monitoring module may be used to automatically disable an infected host computer, thus preventing the spread of viruses. A monitoring module may also be used to re-image the hard disk of an infected computer, thus eliminating the virus. This may occur automatically, or it may provide convenience to an IT department, who can administer the infected PC remotely without re-connecting it to the network. A monitoring module can also limit the spread of malicious software by automatically triggering generation of a defensive firewall rule upon detection of a threat. Thus the spread of malicious software can be contained.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A circuit board comprising:
   a host module controlled by a host module processor, wherein the host module includes a network interface;
   a monitoring module, operating independently from the host module, configured to passively monitor traffic of a front side bus of the host module via a first plurality of traces connecting the front side bus of the host module to the monitoring module, and
   a second plurality of traces connecting the host module to the monitoring module;
   a third plurality of traces connecting the host module to the monitoring module, wherein the third plurality of traces connects said network interface of the host module to the monitoring module;
   wherein the host module also includes a northbridge connected to the front side bus and to a peripheral bus;
   wherein the second plurality of traces connects said peripheral bus of the host module to the monitoring module; and
   wherein the monitoring module is configured to passively monitor traffic of said peripheral bus and said network interface of the host module.

2. The circuit board of claim 1, wherein the monitoring module is configured to begin at least one of saving or transmitting at least some of the monitored traffic upon recognition of a pattern in the traffic.

3. The circuit board of claim 2, wherein the pattern represents reading from or writing to a region of a random access memory of the host module.

4. The circuit board of claim 1, further comprising a plurality of host modules, wherein each host module is controlled by a different host module processor.

5. The circuit board of claim 4, wherein the monitoring module monitors one host module at a time.

6. The circuit board of claim 1, wherein the monitoring module is configured to halt the execution of software on the host module.

7. The circuit board of claim 1, wherein the monitoring module is configured to create a shadow copy of a random access memory of the host module.

8. The circuit board of claim 1, wherein the monitoring module is configured to transmit information via said peripheral bus of the host module.

9. A monitoring module comprising:
   an input for receiving front side bus traffic of a monitored computer without affecting the operation of said monitored computer;
   an input for receiving network traffic of the monitored computer without affecting the operation of said monitored computer; and
   a network interface;
   wherein the monitoring module is configured to operate independently of the monitored computer;
   wherein the monitoring module is configured to send instructions or data to the monitored computer via the front side bus of the monitored computer; and
   wherein the monitoring module is configured to receive configuration data via the network interface.

10. The monitoring module of claim 9, wherein the configuration data determines, at least in part, what traffic received from the front side bus of the monitored computer will be saved.

11. The monitoring module of claim 9, wherein the monitoring module is configured to create a shadow copy of a random access memory of said monitored computer.

12. The monitoring module of claim 9, wherein the monitoring module is configured to read the contents of a random access memory of the monitored computer.

13. The monitoring module of claim 12, wherein the monitoring module is configured to transmit at least some of the contents of the random access memory of the monitored computer via the network interface of the monitoring module.

14. The monitoring module of claim 9, wherein the monitoring module is configured to write to a random access memory of the monitored computer.

15. The monitoring module of claim 9, wherein the monitoring module is configured to halt the execution of software on the monitored computer.

16. The monitoring module of claim 15, wherein the monitoring module is configured to halt the execution of software on the monitored computer upon recognition of a pattern.

17. The monitoring module of claim 9, further comprising:
   an input for receiving peripheral bus traffic of the monitored computer without affecting the operation of said monitored computer.

18. The monitoring module of claim 17, wherein the monitoring module is configured to connect to a second processor socket of the monitored computer in order to receive the front side bus traffic of a first processor located in a first processor socket of the monitored computer, the first processor socket different than the second processor socket.

19. A method of monitoring the execution of software on a host computer comprising the steps of:
- receiving traffic from a first bus of a host computer without altering the operation of said host computer;
- receiving traffic from a network interface of the host computer without altering the operation of said host computer;
- selectively storing at least some of the traffic;
- transmitting at least some of the selectively stored traffic via a network interface of a monitoring module that operates independently of the host computer; and
- halting a processor connected to the first bus of the host computer.

20. The method of claim 19, wherein the step of selectively storing at least some of the traffic is performed by creating a shadow copy of a random access memory of the host computer.

21. The method of claim 20, wherein the contents of the shadow copy is initialized to zero prior to the selectively storing step.

22. The method of claim 20, wherein the contents of the shadow copy is initialized to substantially mirror the contents of the random access memory of the host computer.

23. The method of claim 19, wherein the step of selectively storing at least some of the traffic is initiated upon recognition of a pattern that is described in instructions received via said network interface of the monitoring module.

24. The method of claim 23, wherein the selective storage of at least some of the traffic is stopped upon recognition of a second pattern described in the instructions received via said network interface of the monitoring module.

25. The method of claim 19, further comprising the step of reading a random access memory of the host computer and transmitting its contents via said network interface of the monitoring module.

26. The method of claim 19, further comprising the step of receiving traffic from a second bus of the host computer without altering the operation of said host computer.

27. One or more non-transitory computer-readable media having stored thereon executable instructions that, when executed by a monitoring module, perform:
- receiving configuration data from an administrative computer;
- receiving traffic from a first bus of at least one of a plurality of host computers, wherein the monitoring module is operating independently of each of the plurality of host computers;
- storing in the monitoring module at least some of the traffic;
- sending at least some of the stored traffic to the administrative computer; and
- writing to a random access memory of at least one of the host computers.

28. The one or more computer-readable media of claim 27, wherein the instructions, when executed by the monitoring module, also perform:
- receiving traffic from a second bus of at least one of the host computers.

29. The one or more computer-readable media of claim 27, wherein the received traffic is selected by sending a signal to select at least one of the host computers to a gate.

30. The one or more computer-readable media of claim 27, wherein the instructions, when executed by the monitoring module, also perform:
- halting a processor of at least one of the host computers.

31. The one or more computer readable media of claim 30, wherein halting the processor of the at least one of the host computers is performed upon recognition of a pattern in traffic received from the corresponding host computer.

* * * * *